No. 622,916. Patented Apr. 11, 1899.
W. F. DAVIS & T. CASCADEN, Jr.
GRINDING MILL.
(Application filed Nov. 25, 1898.)
(No Model.) 2 Sheets—Sheet 2.

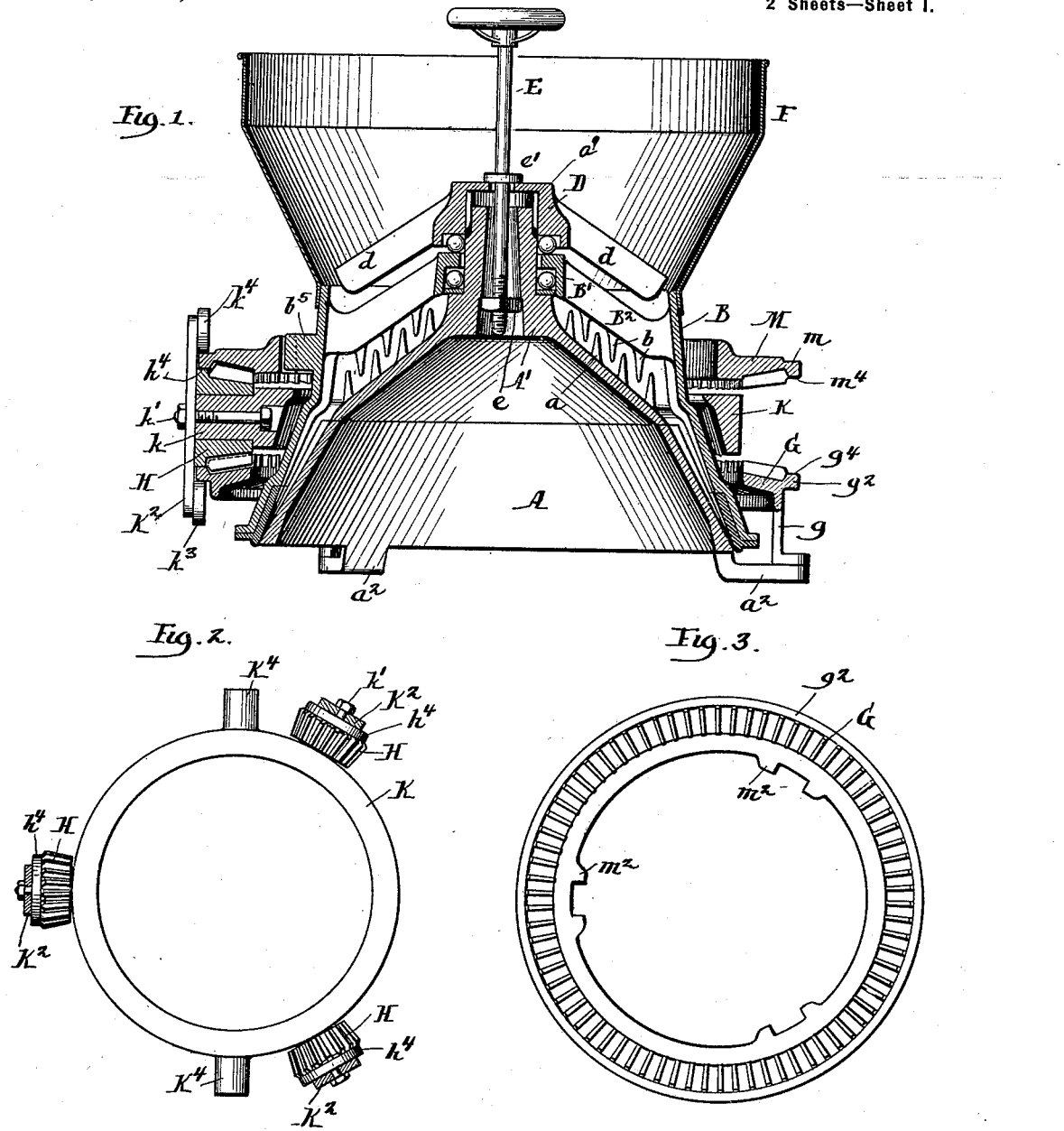

Witnesses:
Fred Gerlach
Alberta Adamick

Inventors:
W. F. Davis & T. Cascaden Jr.
By Pirie & Fisher
Attorneys

UNITED STATES PATENT OFFICE.

WILLIAM F. DAVIS AND THOMAS CASCADEN, JR., OF WATERLOO, IOWA, ASSIGNORS TO THE DAVIS GASOLINE ENGINE WORKS COMPANY, OF SAME PLACE.

GRINDING-MILL.

SPECIFICATION forming part of Letters Patent No. 622,916, dated April 11, 1899.

Application filed November 25, 1898. Serial No. 697,383. (No model.)

*To all whom it may concern:*

Be it known that we, WILLIAM F. DAVIS and THOMAS CASCADEN, Jr., residents of Waterloo, in the county of Black Hawk, State of Iowa, have invented certain new and useful Improvements in Grinding-Mills, of which the following is hereby declared to be a full, clear, and exact description.

This invention has relation more particularly to that class of feed-mills commonly known as "sweep-mills;" and the object of the invention is, primarily, to provide improved multiplying-gear mechanism whereby the revoluble grinder of the mill may be driven at an increased rate of speed.

The invention consists in the features of improvement hereinafter described, illustrated in the accompanying drawings, and particularly pointed out in the claims at the end of this specification.

Figure 4:
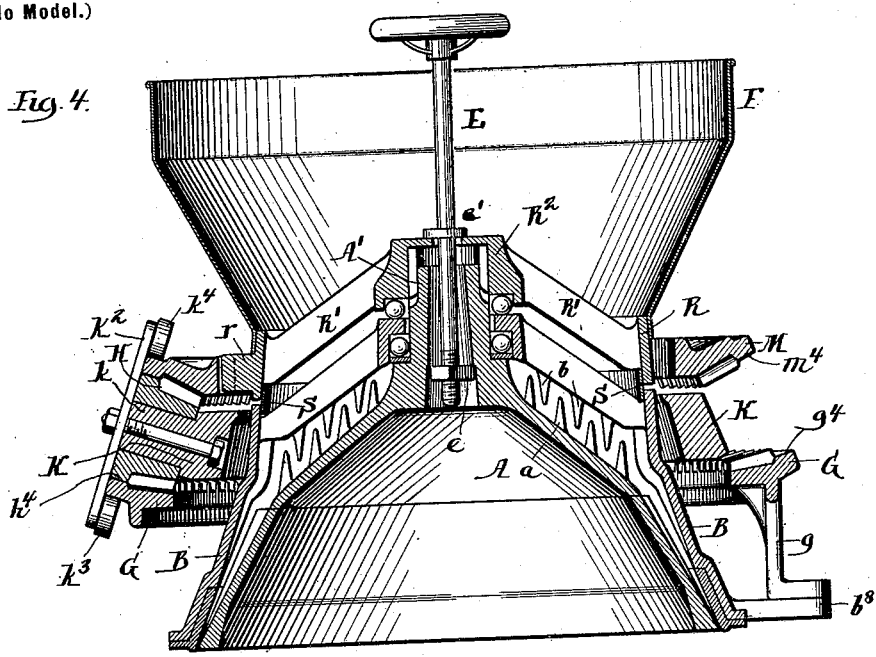
Figure 5:
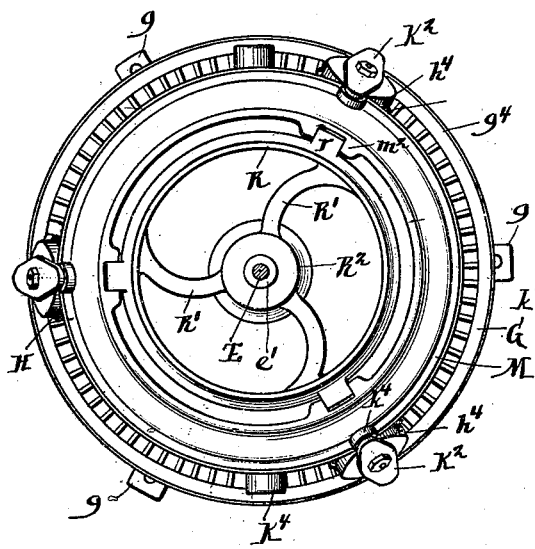
Figure 6:
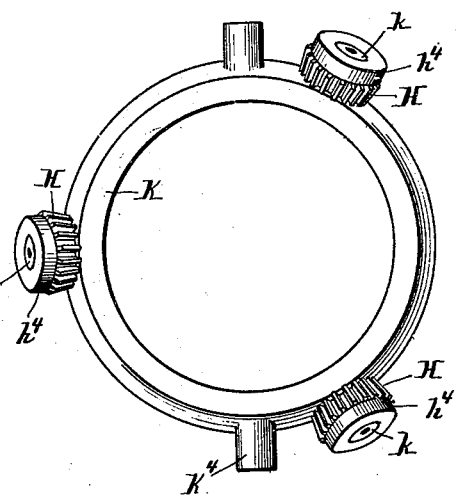

Figure 1 is a view in central vertical section through a feed-mill embodying the invention. Fig. 2 is a detail plan view of the revoluble ring or support whereby the orbitally-moving pinions are carried. Fig. 3 is a detail inverted plan view of the revoluble rack. Fig. 4 is a view similar to Fig. 1, but showing a modified form of the invention. Fig. 5 is a plan view with the hopper removed. Fig. 6 is a detail plan view of the ring or support whereby the orbitally-movable pinions are carried.

A designates the inner shell or cone of the mill, and B denotes the outer shell, both the inner and outer shells being provided upon their opposing faces with grinding-surfaces of any usual or suitable construction. From the top of the shell A rises the cone-post A', that is encircled by the hub B', that is connected with the shell B by suitable arms $B^2$, the arms $B^2$ being formed with downwardly-extending teeth $b$, that coöperate with corresponding teeth $a$, that rise from the upper part of the cone or shell A in manner well understood in the art. The top of the cone-post A' is preferably of polygonal shape, and upon this part of the post is mounted the hub D of the cob-breaker, the radial arms $d$ of which extend outward over the arms $B^2$. Suitable ball or roller bearings are interposed between the wearing parts of the hub around the cone-post. Through the cone-post A' passes the temper-screw E, the lower threaded end of which is provided with a nut or washer $e$, that engages a contracted part of the opening in the cone-post, and the temper-screw E is provided with a collar $e'$, that bears against the inwardly-flanged portion of the hub D. This arrangement of parts enables the temper-screw to adjust the inner shell A, in order to hold the grinding-surfaces in proper operative relation to each other. To the top of the outer shell B is fixed the hopper F, wherein will be placed the grain to be ground. The base of the inner shell A is provided with outwardly-extending feet $a^2$, whereby it will be held in position above the usual box or support, and around the base of the mill is mounted the stationary annular spokeless rack G, this rack being preferably formed with suitable legs $g$, that hold it at the proper height above the base. With the teeth of the stationary annular rack G engage the orbitally-moving pinions H, that are journaled upon studs $k$, that project from the pinion support or ring K, the pinions H being held in place upon the stud $k$ by suitable bolts $k'$, as clearly shown in Fig. 1 of the drawings. Preferably the bolts $k'$ also serve to hold in place the arms or plates $K^2$, that carry the rollers $k^3$ and $k^4$ at their opposite ends. The rollers $k^3$ serve to engage with the rim or plain portion $g^2$ beneath the stationary annular rack G, while the rollers $k^4$ engage with the corresponding rim or plain portion $m$ of the revoluble rack M. This rack M is formed with downwardly-facing teeth that mesh with the teeth of the pinions H, and upon the interior of the annular rack M are formed suitable lugs or offsets $m^2$, (see Fig. 3,) that engage lugs $b^5$, projecting outwardly from the shell B, and thus serve to lock the outer shell to the revoluble annular rack M, while at the same time allowing a vertical movement of the outer grinding-shell without affecting the revoluble rack. The pinion support or ring K is provided with suitable lugs $K^4$, to which will be connected in the usual manner a sweep to which the horses will be attached for driving the mill.

From the foregoing description it will be seen that when power is applied to the revoluble pinion support or ring K the pinions H will be caused to travel around the base of the mill and over the fixed rack G. The motion of translation and the motion of revolution thus imparted to the pinions H will cause an increased speed of revolution to be imparted to the rack M, and inasmuch as this rack is connected to the shell B it will be seen that an increased speed of revolution will be imparted to the shell and to the grinding-surface carried thereby.

By reference to Fig. 1 of the drawings it will be seen that the opposing faces of the racks G and M are provided, respectively, with the annular bearing-surfaces $g^4$ and $m^4$, that will engage with the corresponding plain faces $h^4$ of the pinions H. Inasmuch as the rack-bars are formed separate from the shells A and B it will be seen that the movement of the shells incident to the grinding operation will in no wise affect the relative position of the rack-bars and the pinions. Moreover, the construction of rack-bars is such that they can be readily applied with but very slight change to many of the usual styles of feed-mills now common in the market.

In Figs. 4 to 6 of the drawings is illustrated a modified form of the invention. In this form the inner shell or cone A is revoluble, while the outer shell B is stationary, being provided with outwardly-extending feet $b^8$, that will be fixed to the usual box or support, whereon the mill will rest. Around the mill are placed the annular spokeless racks G and M, the rack G being supported by suitable legs $g$, preferably cast integral with the rack. Between the racks G and M are interposed the orbitally-movable pinions H, these pinions being supported by the ring K, as in the construction hereinbefore described. It will be observed, however, that in this form of the invention the ring or support K has its journal-stud $k$ projecting upwardly and outwardly in order to hold the pinions H in position to engage the racks of different diameters. The pinions H are formed with the smooth bearing-surfaces $h^4$, against which will bear the smooth annular portions $m^4$ and $g^4$ of the racks. The pinions H are held in position upon the supporting-ring K, as in the construction hereinbefore described. In this form of the invention the lower stationary pinion is larger than the upper revoluble pinion, and inasmuch as the lower pinion has a greater number of teeth it is manifest that at each complete revolution of the pinions H more than two revolutions will be imparted to the upper rack M. The upper rack M is formed with suitable offset portions $m^2$, that engage the lugs $r$, that project outwardly from the annular rim R of the cob-breaker, this rim R being connected by arms $R'$ to the cob-breaker hub $R^2$, that encircles the cone-post $A'$ of the mill. The annular rim R will extend above the upper edge of the outer shell B, and in order to prevent the escape of material being ground there is attached to the lower edge of the annular rim R an annular guard plate or ring S, that extends across the joint between the top of the shell B and the lower edge of the cob-breaker rim R. This annular steel plate or ring S will permit a slight movement of the parts incident to the grinding operation. From the foregoing description it will seen that when revolution is imparted to the pinion-ring K and the pinions H corresponding revolution will be given to the ring R of the cob-breaker and through the medium of the hub $R^2$ and the cone-post $A'$ to the inner revoluble shell A, the hub $R^2$ of the cob-breaker being interlocked with the cone-post $A'$ by lugs $a^9$, that enter vertical grooves $a^4$ at the top of the cone-post. It will be understood, of course, that suitable ball or roller bearings will be interposed between the hub $B'$ of the shell B and the cone-post and between the hub $B'$ and the cob-breaker hub $R^2$. The inner revoluble shell A and the cob-breaker will receive a speed of revolution more than twice that of the pinion support or ring K because of the fact that the lower stationary rack G, with which the pinions H mesh, contains a greater number of teeth than the upper revoluble rack M.

This invention affords a simple and effective gearing for feed-mills and one that can be readily applied to many existing forms of such mills. Moreover, it will be understood that in event it is desirable to do away with the gearing the mill can be driven in the usual manner, the sweep for attachment to the team being in such case directly connected with the revoluble grinding member.

Having thus described our invention, what we claim as new, and desire to secure by Letters Patent, is—

1. A multiplying-gear for a grinding-mill comprising two annular spokeless racks arranged one above the other and adapted to set around a grinding-mill, orbitally-movable pinions interposed between said racks and a revoluble ring or support to which said pinions are connected.

2. A multiplying-gearing for a grinding-mill comprising two annular spokeless racks arranged one above the other, the lower rack being stationary and the upper rack being revoluble, said stationary rack containing a greater number of teeth than the revoluble rack, pinions interposed between said racks and a revoluble support for said pinions having upwardly and outwardly projecting studs whereon said pinions are carried.

3. The combination with a grinding-mill having a stationary shell and a revoluble shell, of a multiplying-gearing comprising two annular spokeless racks arranged one above the other and around said shells, the revoluble shell being detachably connected with the revoluble rack in manner permitting said shell to move vertically independently of the rack, and orbitally-movable pinions interposed between said racks and a support for said pinions.

WILLIAM F. DAVIS.
THOMAS CASCADEN, JR.

Witnesses:
 JOS. L. LEAVITT,
 W. C. LOGAN.